H. P. ROBERTS.
HUMIDIFIER FOR AUTOMOBILE ENGINES.
APPLICATION FILED AUG. 25, 1916.

1,290,783.

Patented Jan. 7, 1919.

INVENTOR:
Henry P. Roberts
by Macleod, Calver, Copeland & Dike
Attys.

UNITED STATES PATENT OFFICE.

HENRY P. ROBERTS, OF BOSTON, MASSACHUSETTS, ASSIGNOR OF ONE-HALF TO FREDERICK J. BROWN, OF WOBURN, MASSACHUSETTS.

HUMIDIFIER FOR AUTOMOBILE-ENGINES.

1,290,783.　　　　Specification of Letters Patent.　　.Patented Jan. 7, 1919.

Application filed August 25, 1916. Serial No. 116,774.

*To all whom it may concern:*

Be it known that I, HENRY P. ROBERTS, a citizen of the United States, residing at Boston, county of Suffolk, State of Massachusetts, have invented a certain new and useful Improvement in Humidifiers for Automobile-Engines, of which the following is a specification, reference being had therein to the accompanying drawings.

It is well understood that the introduction of proper quantities of moisture into the explosive mixture of hydrocarbon and air results in improved action of internal combustion engines. Greater fuel economy is produced, there is less trouble resulting from carbonizing and other beneficial results are obtained.

My invention has for its object a new and improved device for introducing moisture into the explosive mixture of an internal combustion engine, my particular object being to produce a device which is exceedingly simple and cheap and which can be attached to already existing engines with the least possible amount of change and expense.

The device embodying my invention also affords means by which the amount of moisture introduced is partly regulated by the speed of the engine and partly by previous adjustment made by the operator.

The invention will be fully understood when taken in connection with the accompanying drawings and the novel features thereof will be pointed out and clearly defined in the claim at the close of this specification.

In the drawings, Figure 1 is a side elevation of an automobile engine to the intake manifold of which is attached a device embodying my invention.

Figure 1:
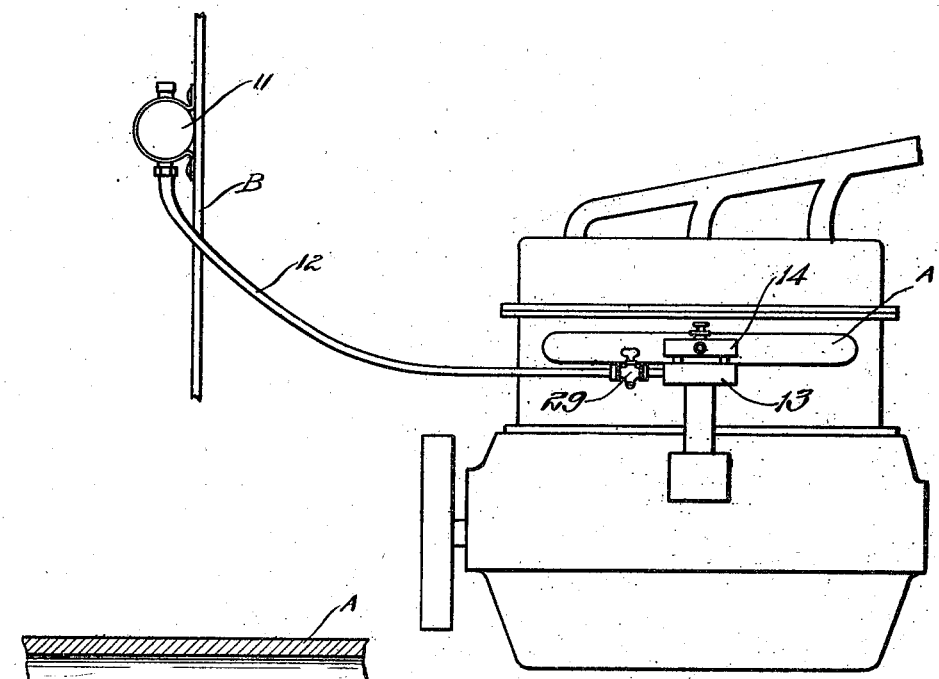
Figure 3:
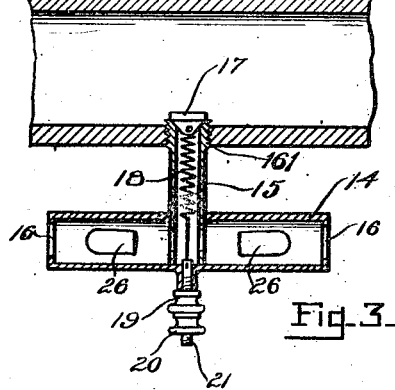
Fig. 3 is a section on line 3—3 of Fig. 2.
Figure 2:
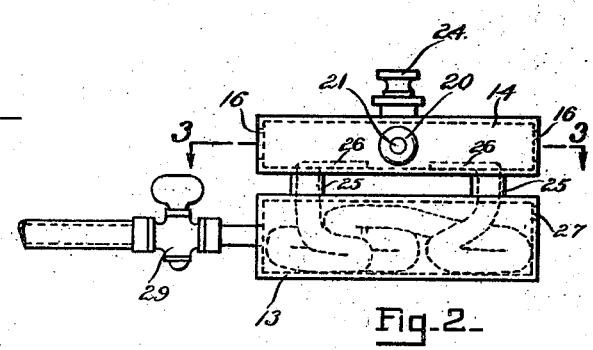
Fig. 2 is a side elevation of the humidifier on an enlarged scale.
Figure 4:
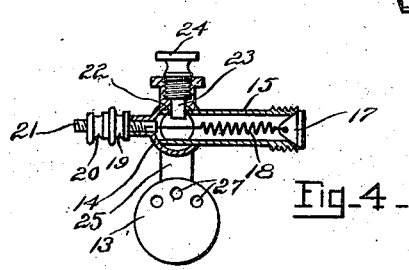
Fig. 4 is an end view partly in section.

Referring to the drawings, at A is shown the intake manifold of an automobile engine and at B is shown a dashboard. At 11 is indicated a tank preferably located on the dashboard in which is placed water to be supplied to the humidifier. Water passes from the tank 11 to the humidifier through the pipe 12. The humidifier is located on the intake manifold of the engine and consists in part of a water chamber 13 and a vaporizing chamber 14, said vaporizing chamber 14 being connected with the intake manifold A by a pipe 15 which is screwed into the hole 16¹ drilled in a side of the intake manifold. The vaporizing chamber 14 is open on its ends as shown at 16, 16 so that air may be swept into the chamber by the draft through the manifold. The opening of the pipe 15 into the manifold is controlled by a spring operated valve 17 which normally rests against a seat formed in the end of the pipe 15. The spring 18 holds the valve closed normally and the tension on the spring may be varied by means of a thumb-nut 19 and check-nut 20 on a rod 21, one end of which is secured to the spring 18.

The pipe 15 passes through the vaporizing chamber 14 and connects with it by a port 22 the opening of which is regulated by an adjustable valve 23 operated by a governor 24. The water chamber 13 is connected with the vaporizing chamber by a plurality of pipes 25, 25, two being employed in the form in the drawing. Through these pipes pass wicks 26, 26, which extend from the water chamber 13 into the vaporizing chamber 14. These wicks are preferably of a size to fill the pipe 25, 25 full. The water chamber is also preferably filled quite full by the lower ends of the wicks or by a stuffing of absorbent material such as felt. At 27 are shown overflow holes which prevent the water in the water chamber rising above a predetermined point. At 29 is shown a stop-cock by which the flow of water may be regulated or completely shut off if desired.

In the operation of my device, the tank 11 is filled with water and the stop-cock 29 is open to permit it to flow into the water chamber 13. The water will saturate the wicking or felt in the water chamber 13 but will not rise above the level of the holes 27. Under ordinary circumstances the felt or wicking in the chamber will hold back the water so that there will be no overflow through the holes 27. When the engine is started, the draft through the manifold will open the valve 17 and draw in air through the vaporizing chamber. This air will be saturated with moisture drawn up by capillary attraction through the wicks 26, 26 from the water chamber 13. The amount of moisture introduced will be regulated by the valve 17 and by the valve 24. The flow of water into the water chamber is controlled by a stop-cock 29.

From the foregoing it will be seen that the device embodying my invention is exceedingly simple and contains nothing which can get out of order. It is compact and small and occupies very little space. It can be installed simply by drilling a hole into the manifold and screwing into it the pipe 15 which carries the humidifier. While it is desirable to place the tank on the dashboard, it may be placed in any other convenient position. The ends of the vaporizing chamber open into the space under the bonnet and around the engine and therefore the air introduced into the engine is well heated and will carry a relatively large amount of moisture. This moist air is introduced into the explosive mixture at a point just above the carbureter and therefore becomes thoroughly mixed before passing into the engine.

What I claim is:

A humidifier for internal combustion engines, comprising a tubular horizontal vaporizing chamber having an air intake passage, a tubular air passage extending from said vaporizing chamber to the intake manifold of the said internal combustion engine, a tubular horizontal water chamber located below and supported by said vaporizing chamber and connected thereto by a pipe, a wick extending from said water chamber into said vaporizing chamber, a water tank, a pipe connecting said tank with the water chamber, a yieldingly operated valve in the passage between the vaporizing chamber and the intake manifold, a spring normally holding said valve closed, and a screw connected to said spring to regulate the tension thereof.

In testimony whereof I affix my signature.

HENRY P. ROBERTS.